UNITED STATES PATENT OFFICE.

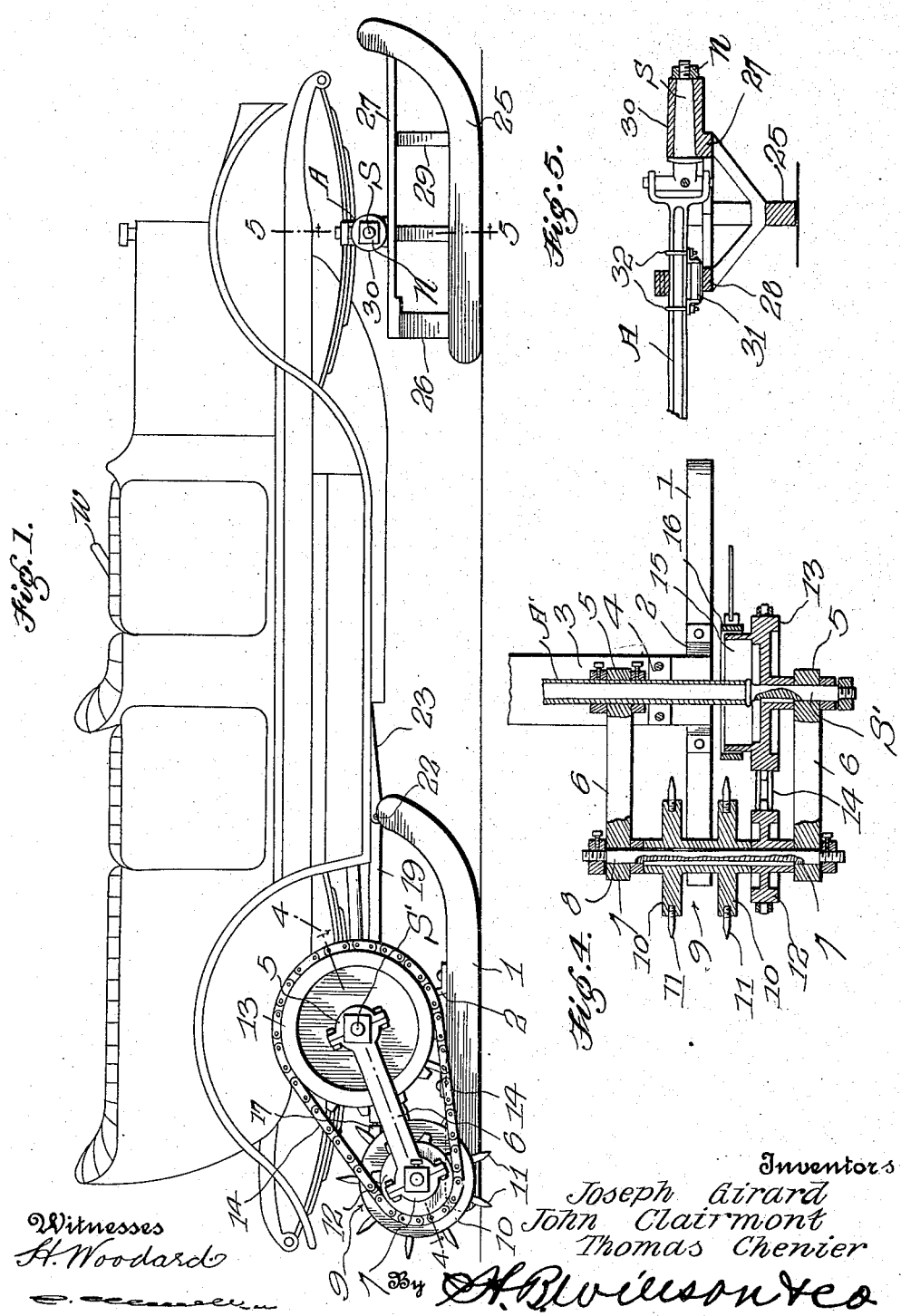

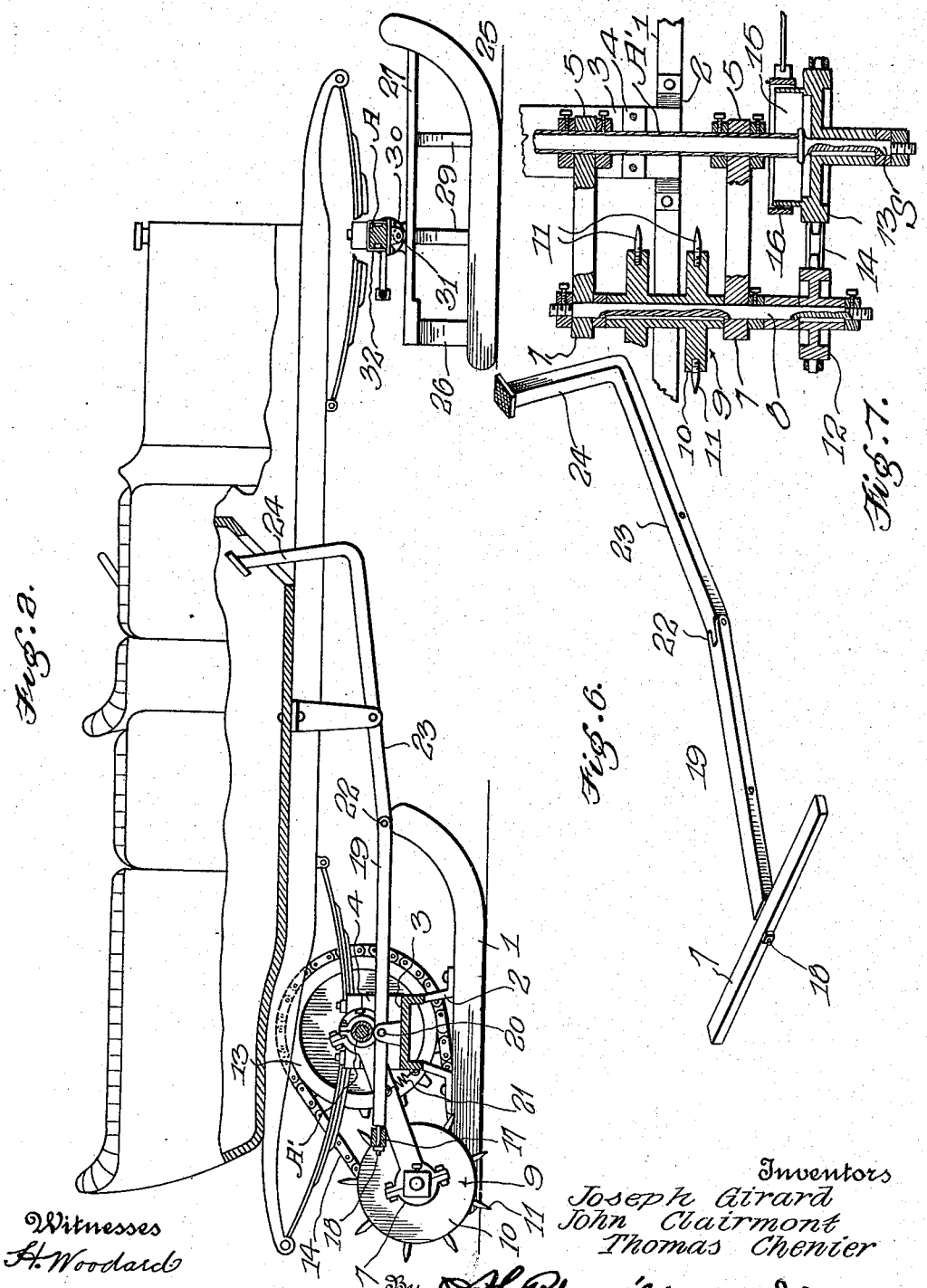

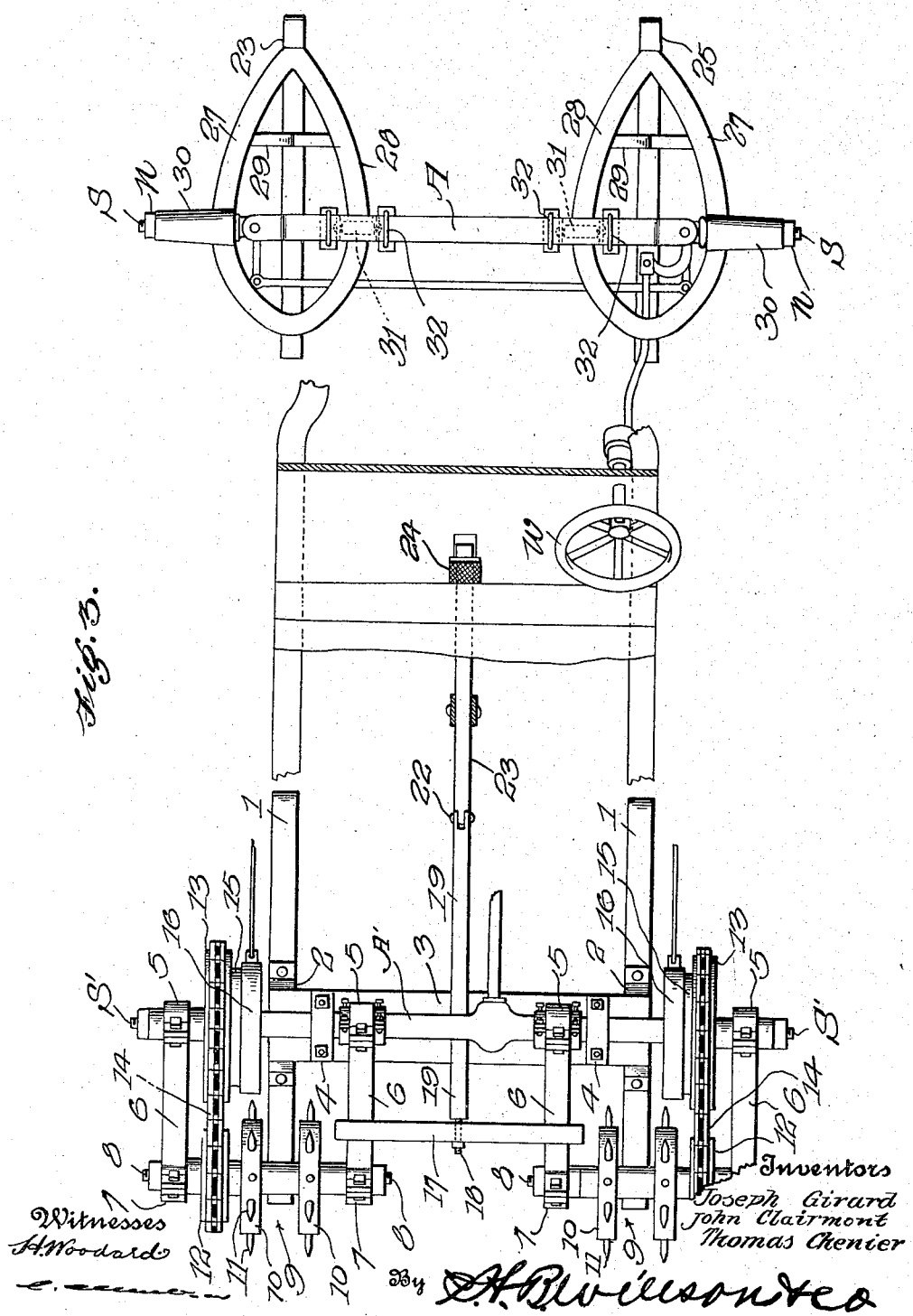

JOSEPH GIRARD, JOHN CLAIRMONT, AND THOMAS CHENIER, OF TUPPER LAKE, NEW YORK.

RUNNER ATTACHMENT FOR AUTOMOBILES.

1,190,284.  Specification of Letters Patent. Patented July 11, 1916.

Application filed August 12, 1915. Serial No. 45,213.

*To all whom it may concern:*

Be it known that we, JOSEPH GIRARD, JOHN CLAIRMONT, and THOMAS CHENIER, subjects of the King of England, residing at Tupper Lake, in the county of Franklin and State of New York, have invented certain new and useful Improvements in Runner Attachments for Automobiles; and I do declare the following to be a full, clear, and exact description of the invention, such as will enable others skilled in the art to which it appertains to make and use the same.

Our invention relates to useful improvements in runner attachments for converting automobiles into power sleighs, and the object of the invention is to provide simple means for accomplishing the desired ends in an effective manner.

With this general object in view, the invention resides in certain novel features of construction and in unique combinations of parts to be hereinafter fully described and claimed, the descriptive matter being supplemented by the accompanying drawings wherein:—

Figure 1 is a side elevation of an automobile equipped with the invention; Fig. 2 is a similar view with parts broken away and in section; Fig. 3 is a top plan view showing the several parts of the attachment, and illustrating only a portion of the automobile body; Fig. 4 is a sectional view taken substantially upon the plane designated by the line 4—4 of Fig. 1; Fig. 5 is a detail vertical transverse section as viewed on the plane of the line 5—5 of Fig. 1; Fig. 6 is a perspective view of the propeller depressing lever and the actuating means therefor; and Fig. 7 is a view similar to Fig. 4 illustrating a different arrangement of parts.

In these drawings which constitute a part of the application and in which like reference characters designate corresponding parts throughout the several views, an automobile is shown which includes the usual front and rear axles A and A'. The front axle A is provided with the usual steering spindles S upon which the front wheels are usually mounted, while the rear axle is equipped, as usual, with driven spindles S' upon which the driving wheels of the vehicle are commonly secured in any preferred manner.

Disposed one beneath each end of the rear axle A' is a pair of parallel runners 1 from whose intermediate portions bolster standards 2 rise, said standards supporting thereon a transverse bolster 3 which is equipped on its upper side, near its opposite ends, with a pair of sectional bearings 4 receiving the axle A' therein. The bearings 4 may be made of numerous sizes to allow the attachment of the runners to automobiles of various makes, but if desired, such bearings may be made adjustable for accomplishing the same purpose.

Having sectional bearings 5 adapted to receive therein the axle proper only as shown in Fig. 7, or to receive said axle and the spindles S, is a plurality of downwardly and rearwardly inclining hanger arms 6, a pair of such arms being disposed at each side of the machine. The rear ends of the arms 6 are preferably equipped with additional sectional bearings 7 in which a pair of transversely alined shafts 8 is rotatably mounted. Secured one on each shaft 8 and disposed between the arms carrying the same, is a pair of weighted propellers 9, each of which comprises one or more wheel like members 10 having projecting from its periphery a plurality of prongs 11 designed to engage the surface of the roadway to propel the vehicle thereover. Likewise secured one to each shaft 8, is a pair of sprocket wheels 12 which are disposed in rear of driving sprocket wheels 13 which are keyed on the spindles S', the sprockets 12 and 13 being operatively connected by sprocket chains 14. The inner sides of the driving wheels 13 are provided with brake drums 15 which coact with the usual brake bands 16 of the automobile to check the rotation of the propellers 9, at will.

In order to normally depress the propellers 9 to cause their prongs 11 to be forced into the roadbed, a transversely disposed lever 17 preferably overlies the innermost arms 6, although the opposite ends of said lever might well be so connected with the arms as to allow such ends to move therewith. The lever 17 is fulcrumed at its center upon a stud 18 which projects rearwardly from a longitudinally disposed operating lever 19, the latter being fulcrumed between its ends to the bolster 3 as disclosed more particularly at 20 in Fig. 2. Connecting the rear arm of the lever 19 with the bolster, and normally drawing such end downwardly, is a heavy coil spring 21, while the front end of said lever is pivoted at 22 to an additional lever 23 likewise fulcrumed between its ends. The lever 23 is shown as provided with an upright foot pedal 24 which projects through a slot in the floor of the automobile body in advance of the driver's seat.

By the construction just described, the propellers 9 are normally depressed by the springs 21, to allow the prongs thereof to sufficiently engage the roadbed for ordinary propelling purposes, but when the brake bands 16 are applied to check the speed of the vehicle, the spring in question will not exert sufficient downward pressure to cause the prongs to dig into the roadbed. This may be accomplished however, by depressing the foot pedal 24 and thus the speed of the vehicle may be either totally or partially arrested.

For supporting the front axle A, an additional pair of parallel runners 25 is provided, said runners being provided at their rear ends with standard members 26 while their front ends are curved upwardly as usual. Secured at their rear ends to the standard members 26, and at their forward ends to the upwardly curved front ends of the runners, is a pair of horizontally disposed outwardly bowed supporting bars 27, one being carried by each runner, while extending inwardly one from each runner, and having their ends likewise anchored to the front ends of said runners and to the standard members 26, is a pair of inwardly bowed horizontally disposed track bars 28, appropriate braces 29 being provided between the bars 27 and 28 and the runners. The supporting bars 27 are provided with transversely disposed hub members 30 which may either be formed integrally therewith or rigidly secured thereto in any preferred manner, such members receiving therein the steering spindles S and being held in position by nuts N, while the track bars 28 abut bearing members 31 here shown in the form of anti-friction rollers secured by clips 32 to the axle A. Thus it will be evident that as the steering wheel W of the automobile is turned to steer the spindles S, the runners 25 will be turned accordingly, thus allowing the direction of travel to be fully under the control of the operator.

From the foregoing description, taken in connection with the accompanying drawings, it will be evident that although comparatively simple construction has been shown for carrying out the object of the invention, such construction will be efficient and durable, will possess a number of advantages, and may be manufactured so as to render it readily attachable to motor vehicles of various makes.

In the drawings, certain specific details of construction have been shown for accomplishing probably the best results, and in the preceding, such details have been described, but it is obvious that we need not be restricted thereto otherwise than to the extent to which the appended claims limit us.

We claim:

1. An attachment for general application to automobiles of numerous types, consisting of a pair of runners and a bolster connecting the same, sectional bearings carried by the bolster and adapted to receive therein portions of the rear axle of the automobile, downwardly and rearwardly inclining hangers having sectional bearings at their front ends also designed to receive portions of the axle, rotary propellers carried by the rear ends of the hangers and having sprockets, a pair of driving sprockets adapted to be secured on the driven spindles at the ends of the axle, sprocket chains passing around the driving sprockets and the first named sprockets, a longitudinally disposed lever fulcrumed between its ends to the center of the bolster, a transverse lever overlying the hangers and fulcrumed between its ends to the rear end of the longitudinally disposed lever, a spring connected at one end to the bolster and at its other end to the rear end of the longitudinal lever whereby to exert a constant yielding downward pull thereon to normally depress the transverse lever and thus prevent excessive raising of the hangers to retain the propellers in engagement with the road bed, and manually operated means for raising the front end of the longitudinal lever, whereby to positively depress the transverse lever at will.

2. The combination with a runner attachment for motor vehicles, including a pair of depressible members and driven propellers carried by said members; of a horizontal transverse lever fulcrumed between its ends and having said ends movable vertically with the aforesaid members, spring means for normally depressing the transverse lever to engage the propellers with the roadway, a longitudinally disposed lever carrying the fulcrum of the transverse lever and having a non-yieldable fulcrum, and manually operated means for actuating said longitudinally disposed lever to positively depress the transverse lever and the propellers.

In testimony whereof we have hereunto set our hands in presence of two subscribing witnesses.

JOSEPH his X mark GIRARD.
JOHN CLAIRMONT.
THOMAS CHENIER.

Witnesses:
FRED E. POTTER,
VIVA B. SUELL.

Copies of this patent may be obtained for five cents each, by addressing the "Commissioner of Patents, Washington, D. C."